Figure 3:
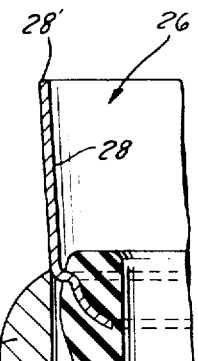

United States Patent
Greer

[15] 3,675,306
[45] July 11, 1972

[54] METHOD OF MAKING PRESSURE VESSEL

[72] Inventor: Edward M. Greer, Beverly Hills, Calif.
[73] Assignee: Greer Hydraulics, Inc., Los Angeles, Calif.
[22] Filed: May 29, 1969
[21] Appl. No.: 828,842

Related U.S. Application Data

[62] Division of Ser. No. 657,621, Aug. 1, 1967, Pat. No. 3,500,866.

[52] U.S. Cl. .............................................. 29/487, 29/486
[51] Int. Cl. ........................................................ B23k 31/02
[58] Field of Search ............... 220/85 B, 22; 138/30; 29/487, 29/486

[56] References Cited

UNITED STATES PATENTS

| | | | |
|---|---|---|---|
| 2,878,834 | 3/1959 | Mercier | 138/30 |
| 2,962,612 | 11/1960 | Lung | 138/30 X |
| 3,038,501 | 6/1962 | Greer | 138/30 |
| 3,088,492 | 5/1963 | Mercier | 138/30 |
| 3,195,576 | 7/1965 | Mercier | 138/30 |
| 3,397,719 | 8/1968 | Ortheil | 138/30 |
| 3,425,593 | 2/1969 | Kromer et al. | 138/30 X |
| 3,251,380 | 5/1966 | Mercier | 138/30 |
| 3,368,586 | 2/1968 | French et al. | 138/30 |

*Primary Examiner*—John F. Campbell
*Assistant Examiner*—Ronald J. Shore
*Attorney*—Arthur B. Colvin

[57] ABSTRACT

This disclosure relates to the art of pressure vessels, more particularly of the type having a cylindrical container, one end of which is closed and has a port and the other end of which defines an open mouth. The container has a deformable bladder of resilient material positioned therein, said bladder having a large mouth with an annular metal supporting member secured thereto and extending outwardly therefrom, the free edge portion of said supporting member which is longitudinally spaced from the region where the bladder is secured thereto, being fused to the mouth of the container. The container has suitable means closing the mouth thereof.

3 Claims, 4 Drawing Figures

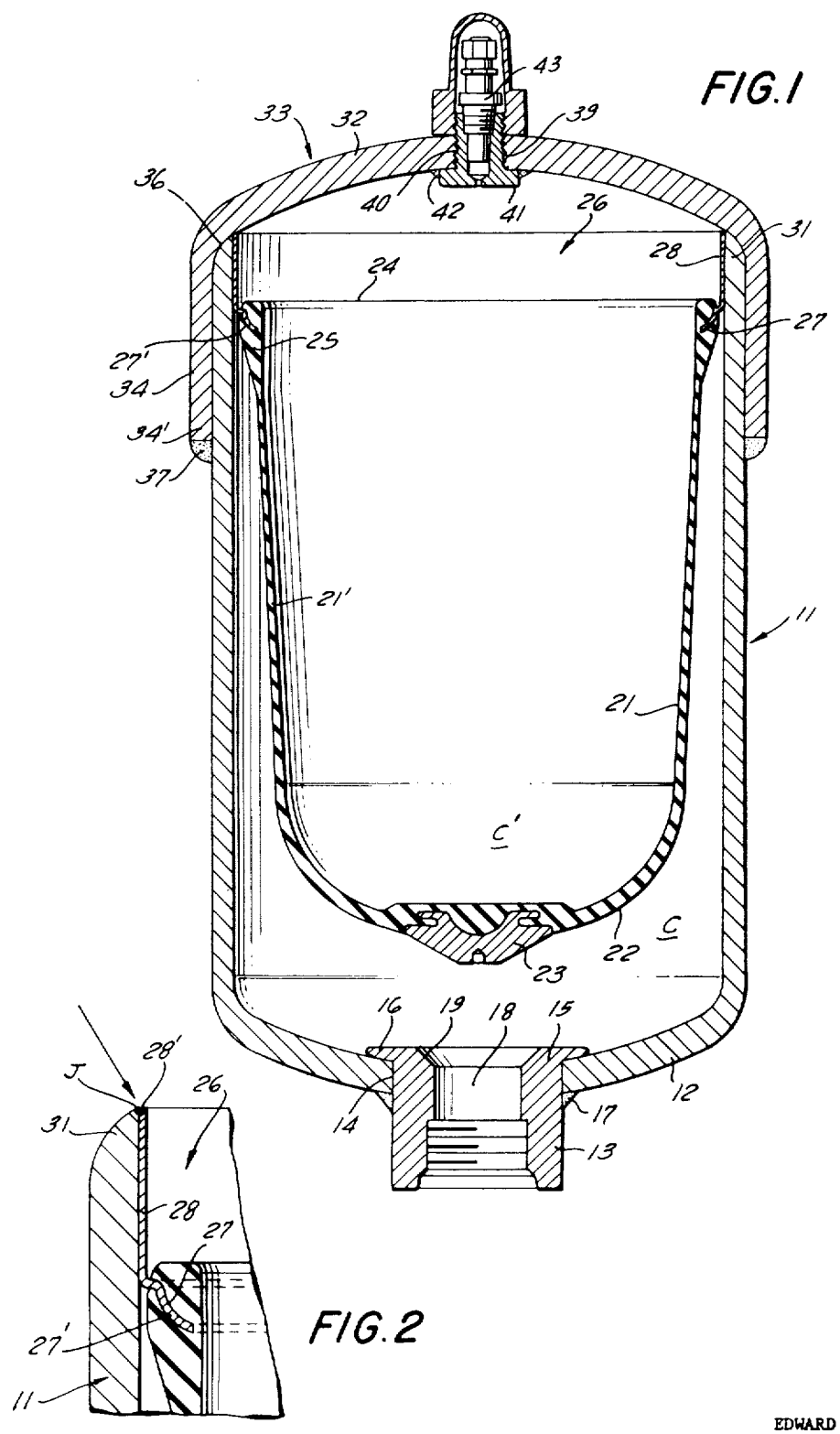

METHOD OF MAKING PRESSURE VESSEL

This application is a division of copending application Ser. No. 657,621, filed Aug. 1, 1967, now U.S. Pat. No. 3,500,866.

As conducive to an understanding of the invention, it is noted that where a pressure vessel is of the type comprising a rigid container with a deformable bladder therein intervening between two ports through which fluid may flow into and out of the chambers defined by the bladder on each side thereof, if the bladder in communication with one of the ports is not dependably secured in place, leakage may occur with resultant malfunctioning of the pressure vessel.

It is accordingly among the objects of the invention to provide a pressure vessel of the above type and method of fabricating the same, which pressure vessel may readily be manufactured at relatively low cost and which will provide for dependable retention of the bladder in the container with assurance that a dependable leakproof seal will be provided to prevent leakage of the fluid from the chambers defined by the bladder.

According to the invention these objects are accomplished by the arrangement and combination of elements hereinafter described and more particularly recited in the claims.

Figure 4:
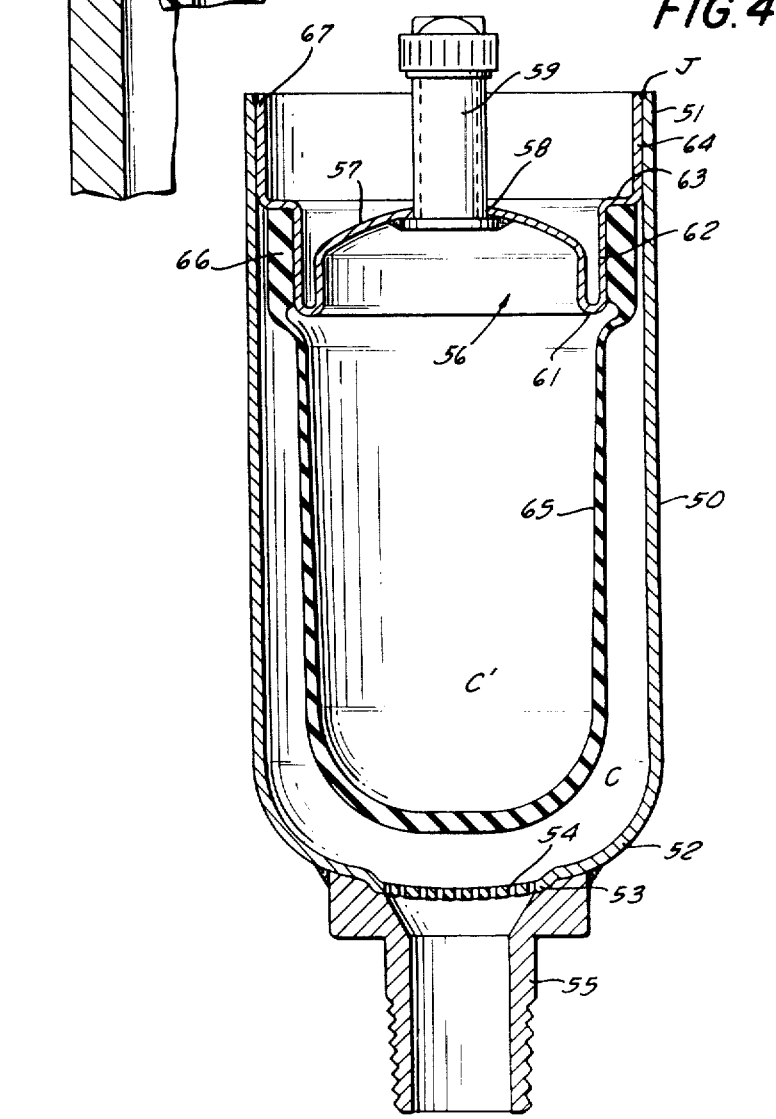

In the accompanying drawings in which is shown one of various possible embodiments of the several featured of the invention, FIG. 1 is a longitudinal cross sectional view of a pressure vessel made in accordance with the invention herein, FIG. 2 is an enlarged detail sectional view showing the connection of the supporting member to the container;

FIG. 3 is a fragmentary detail view illustrating a step in the assembly of the pressure vessel, and FIG. 4 is a longitudinal sectional view of another embodiment of the invention.

Referring now to the drawings, the pressure vessel shown in FIGS. 1 to 3 illustratively comprises a substantially cylindrical container 11 of rigid material such as steel or aluminum, capable of withstanding the pressure to which it is to be subjected in use.

The container 11 has one end closed as at 12 and a sleeve 13 is positioned in an axial opening 14 in such closed end. As is clearly shown, the inner end 15 of the sleeve has an outwardly extending annular flange 16 which rests on the periphery of opening 14, and the sleeve is secured in fixed position as by welding as at 17.

The bore 18 of the sleeve 13, which defines a port through which fluid may flow, has its inner end 19 beveled to define a valve seat.

Positioned in the container 11 is a deformable partition, illustratively in the form of an elongated bladder 21 of rubber or similar material having like characteristics. The bladder 21 is closed at one end as at 22 and such closed end 22 has secured thereon and preferably molded integral therewith a rigid button or valve member 23 which is axially aligned with the bladder and designed to move against the valve seat 19 when the bladder is expanded to close the port 18.

The bladder preferably is substantially frustoconical in cross section with the side wall 21' thereof being of greater diameter at the mouth 24 of the bladder that at the closed end 22 thereof.

The mouth 24 of the bladder has a thickened rim 25 to which an annular supporting member 26 is affixed by being bonded thereto or molded therein as illustratively shown. The supporting member 26 is of relatively thin resilient sheet metal such as sheet steel and has a curved lower or mounting portion 27 convex on its lower surface as at 27' and an upper or retaining portion 28. The lower portion 27 is molded integrally into the thickened rim 25, with the upper portion 28 being transversely spaced outwardly from the lower portion and extending upwardly beyond such rim.

Inasmuch as it is costly to hold diametrical tolerances on deep drawn low cost cups as well as on metallic rings, the upper portion 28 of the supporting member 26 initially tapers out slightly as shown in FIG. 3, so that the outer diameter of its free edge 28' is just slightly greater than the inner diameter of the container 11 adjacent the mouth 31 thereof. Thus, when such upper portion is forced into the mouth 31 of the container 11 it will readily fit therein with a snug fit with at least the free edge 28' of the upper portion 28 completely touching the inner surface of the container adjacent its mouth with discontinuities or gaps. The upper portion 28 of the supporting member 26 is permanently secured in the mouth 31 of the container 11 by being fused thereto as at J in the manner hereinafter to be described, it being noted that the fusing of such portion 28 to the wall of the container 11 adjacent its mouth 31 provides a positive seal.

Encompassing the mouth 31 of the container 11 is a cup-shaped cap 33, the side wall 34 of which is of inner diameter just slightly greater than the outer diameter of the container 11 so that said cap may fit relatively snugly over the mouth 31 of the container with the floor 32 of the cap resting against the extremity of mouth 31 as at 36. The length of the side wall 34 is such that its free edge 34' will be longitudinally spaced beyond the thickened rim 25 of the bladder in which the lower portion 27 of the supporting member 26 is molded. The cap is permanently secured in place as by being welded at its free edge 34' to the container wall as at 37. The cap is provided with a suitable axial opening 39 in which a sleeve 40 having a flange 41 is positioned and welded in place as at 42, the sleeve mounting a conventional air valve 43 for charging of the bladder with gas under pressure.

It is apparent that where rubber is bonded to a steel member such as the rim 25 of the bladder 21 to the lower portion 27 of the supporting member 26 in the embodiment of FIG. 1 herein, the introduction of heat resulting from welding, brazing or fusing, could readily be transferred through the heat conductable steel supporting member 26 to the area where the rubber is bonded to the lower portion 27 of the supporting member 26 and such heat, if excessive, would destroy the bond.

Thus, for example, depending upon the rubber utilized, it is essential that when the supporting member 26 is fused to the container as at J, the heat transmitted to such bond area should not increase over 100°F.

By reason of the assembly method which is the subject of this invention, the transmission of heat to the bond is minimized. Thus, to assemble the pressure vessel above described, the bladder with its associated supporting member 26 is inserted into the container 11 so that the outer periphery of the upper portion 28 of the supporting member 26 will fit snugly in the mouth 31 of the container. Thereupon, the container 11 with the bladder positioned therein is mounted in vertical position on a suitable rotating support and a heating device such as a heating gun or the tip of a heli-arc welding machine using inert gas such as a mixture of argon and helium, is directed against the junction J between the upper edge 28' of the supporting member 26 and the mouth 31 of the container. At the same time that the junction J is being heated, the container is rotated at a constant rate of speed such that due to the intense heat developed and the fact that the suppOrting member 26 is of relatively thin sheet metal, the edge 28' of the supporting member and adjacent portion of the mouth 31 of the container will melt quickly and fuse together and alloy to form a secure, integral joint.

Due to the sPeed Of rotation of the container on its support, heat will be applied to each portion of the junction J for only a relatively short period. Hence, the heat will not be transmitted to any extent along the length of the upper portion 28 so that it will not cause the temperature of the supporting member 26 adjacent the lower portion 27 thereof embedded in the rim 25 of the bladder to be raised sufficiently to cause damage to the bladder.

The fusion action above described is accomplished without need for any electrode rod but relies on the melting action of the upper edge portion 28' of the supporting member and the mouth 31 of the container. Due to the fusion action it is apparent that a complete seal will be effected at the junction J between the upper edge 28' of the supporting member and the mouth 31 of the container so that there will be no leakage from the unit.

After the bladder is secured in the container as previously described, the cap 34 is then positioned over the mouth 31 of the partially assembled container. The container is then turned upside down with the sleeve member 13 directed upwardly and the container is placed on a turntable. Thereupon, a coolant fluid such as machine tool coolant oil is charged through the port 18 into the container to a level of say one-half to three-quarters the length of the container. At this time a conventional welding gun is employed to form a weld 37 at the junction between the edge 34' of the side wall 34 of the cap and the adjacent wall of the container 11, such welding action being performed as the unit is being rotated.

Due to the coolant fluid in the container, it absorbs the heat resulting from the welding action and prevents such heat from rising to a temperature sufficient to injure the bladder positioned in the container. The side wall 34 of the cap 33 is of sufficient length so that by the time the heat can pass from the region where the welding action occurs, to the supporting member 26 and through the latter to the rim 25 of the bladder, the temperature will have dropped, due to the coolant fluid in the shell, to a safe value.

The embOdiment shown in FIG. 4 is similar to the construction shown in copending application Serial No. 595,164 and differs therefrom substantially solely in the means to hold the annular supporting member in fixed position in the container. Thus, the embodiment of FIG. 4 employs the fusing technique of the present invention.

Referring to FIG. 4, the pressure vessel, which in the illustrative embodiment is a pressure accumulator, comprises a shell or container 50 of rigid material such as aluminum, steel, brass or the like, capable of withstanding the pressures to which the unit will be subjected in use.

The container 50 is substantially cylindrical as shown, having a mouth 51 and a rounded lower end 52 having an axial opening 53 therein across which is secured a perforated plate 54. A sleeve 55 axially aligned with the plate 54 is secured to the end of the container and is threaded to permit connection thereto of a correspondingly threaded fitting (not shown).

Positioned in the mouth of the container 50 is a metal retaining member 56 which also forms the cover for the mouth of the container. The member 56 illustratively has a curved central portion 57 with an axial opening 58 in which a fitting 59 is secured to retain an air valve, for example, (not shown). The periphery 61 of the central portion 57 is reversely bent to define a mounting portion 62, the outer edge of which is outwardly bent to define an annular shoulder 63. Rising from the periphery of shoulder 63 is a retaining portion 64 of outer diameter substantially equal to the inner diameter of the container 50, and desirably initially tapering outwardly slightly similar to the portion 28 of the supporting member 26 as shown in FIG. 3.

Secured to the outer surface of mounting portion 62 is a deformable partition 65 illustratively a bladder of synthetic rubber such as Buna, Butyl, Neoprene or similar material having like characteristics.

As is clearly shown in FIG. 4, the mouth of the bladder 65 has an elongated thickened rim 66 which is of length substantially equal to that of the mounting portion 62 and such rim 66 is secured to the mounting portion 62, preferably by being bonded thereto in the manner described in said copending patent application Ser. No. 595,164.

After the rim 66 of the bladder 65 has been bonded to the portion 62, the retaining member 56 with the bladder bonded thereto, is then forced into the open mouth of the container 50, until the upper edge 67 of the retaining portion 64 is aligned with the mouth 51 of the container.

As is shown in FIG. 4, the thickness of the rim 66 is less than the width of the shoulder 63, so that the entire surface of the bladder including the rim 66 will be spaced from the wall of the container 50.

The retaining portion 64 is then permanently secured in the mouth 51 by being fused thereto as at J in the manner previously described.

With the constructions and method above described, a pressure vessel construction is afforded which may be dependably manufactured at relatively low cost and with a minimum of tolerances with assurance that there will be a dependable seal between the oil chamber C and gas chamber C' formed on each side of the bladder so that it may function for long periods without likelihood of breakdown.

As many changes could be made in the above method and constructions, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. The method of assembling pressure vessels of the type having a substantially cylindrical container open at one end with a port through its closed end, said container having a deformable bladder of resilient material positioned therein with a resilient annular supporting member of relatively thin material having one end bonded to the mouth of the bladder and its other end extending beyond such mouth and secured to the mouth of the container, which method comprises the steps of inserting the bladder into the container so that the annular supporting member fits snugly in the mouth of the container with its outer edge substantially co-planar with said mouth of the container and with the wall of the bladder being substantially free of contact with the container throughout its extent, applying intense heat to the junction between the outer edge of the annular supporting member and the adjacent portion of the mouth of the container while rotating said container, to fuse said outer edge of the supporting member to the mouth of the container without any additional fusing material being added.

2. The method set forth in claim 1 in which an end cap is positioned over the mouth of the partially assembled container so that the free edge of said cap is longitudinally spaced from the supporting member and thereupon said free edge of said cap is welded to the outer surface of said container.

3. The method recited in claim 1 in which the portion of the supporting member extending beyond the mouth of the bladder is bent outwardly slightly so as to snugly press against the inner surface of the container mouth when forced therein.

* * * * *